United States Patent [19]

Takeuchi

[11] 4,220,868
[45] Sep. 2, 1980

[54] METHOD OF AND SYSTEM FOR CONTROLLABLY CONNECTING LOAD TO GENERATOR

[75] Inventor: Tohru Takeuchi, Zushi, Japan

[73] Assignee: Nissan Motor Company, Limited, Yokohama, Japan

[21] Appl. No.: 880,226

[22] Filed: Feb. 21, 1978

[30] Foreign Application Priority Data

May 27, 1977 [JP] Japan .......................... 52/67701[U]

[51] Int. Cl.² .............................................. H02P 9/04
[52] U.S. Cl. .................................... 290/7; 290/40 A; 322/8
[58] Field of Search ................ 290/7, 40 R, 40 A, 51; 322/7, 8, 10–12, 29, 40; 318/485

[56] References Cited

U.S. PATENT DOCUMENTS

| 3,543,037 | 11/1970 | Baldwin | 290/7 |
| 3,828,742 | 8/1974 | Weis | 290/40 A |
| 3,875,487 | 4/1975 | White | 318/485 |

Primary Examiner—J. V. Truhe
Assistant Examiner—Eugene S. Indyk
Attorney, Agent, or Firm—Lowe, King, Price & Becker

[57] ABSTRACT

In a generator system, a load is alternatively connected to or disconnected from a generator to make it easy for the generator to get the load to start.

5 Claims, 5 Drawing Figures

METHOD OF AND SYSTEM FOR CONTROLLABLY CONNECTING LOAD TO GENERATOR

BACKGROUND OF THE INVENTION

This invention relates to a generator system utilizing, as a prime mover for a generator, such as a two-shaft gas turbine engine or a turbo supercharged reciprocatory internal combustion engine, and more particularly to a control system for controllably connecting a load, such as a motor, to a generator.

A maximum load which could be connected to a generator at a moment is set at a level lower than a rated load of the generator. This is due to the fact that initially a great current and output are required for the generator to get the motor to start. For example, the largest of motors which could be connected at a moment to a generator having a rated load of 250 KVA is a motor which has a rated load of 100KVA. Therefore, when installing a home use generator system (for emergency or standby use), it is necessary to arrange a generator that has a rated load considerably greater than a rated load of a motor adapted to be connected to the generator. In arranging a generator system it is the common paractice to select a prime mover which can afford to drive such a generator and to arrange the prime mover within the safest or least affected area in case of fire. A problem, however, arises if prime mover is for some reason to be operated within an area where the intake air temperature might rise in case of fire. If the intake temperature rises, the volumetric efficiency drops leading to a drop of power output from the prime mover. This is particularly the case when the prime mover is a two-shaft gas turbine engine. The problem is that excess load is applied to the prime mover causing the prime mover to stall upon connecting a motor to a generator driven by the prime mover because the motor requires, for start-up operation, an input far greater than its rated input and there is a drop of power output from the prime mover when the intake air temperature rises.

SUMMARY OF THE INVENTION

It is an object of the invention to provide a generator system which is free from the problem as above.

In a generator system according to the invention, in order to eliminate the probability that a prime mover might stall when a load applied to the prime mover becomes excessive, a motor is disconnected from a generator driven by the prime mover before the prime mover tends to stall upon start-up operation of the motor, i.e., when the revolution speed of the generator decreases below a certain level, to allow the prime mover to increase its rotation speed and when the revolution speed of the prime mover approaches its rated revolution speed subsequently, the motor is again connected to the generator. The connection of the motor to the generator and disconnection thereof from the latter take place alternatively and repeatedly until the motor starts.

BRIEF DESCRIPTION OF THE DRAWINGS

The invention will be described hereinafter with reference to the accompanying drawings, in which.

DESCRIPTION OF THE PREFERRED EMBODIMENT

Figure 1:
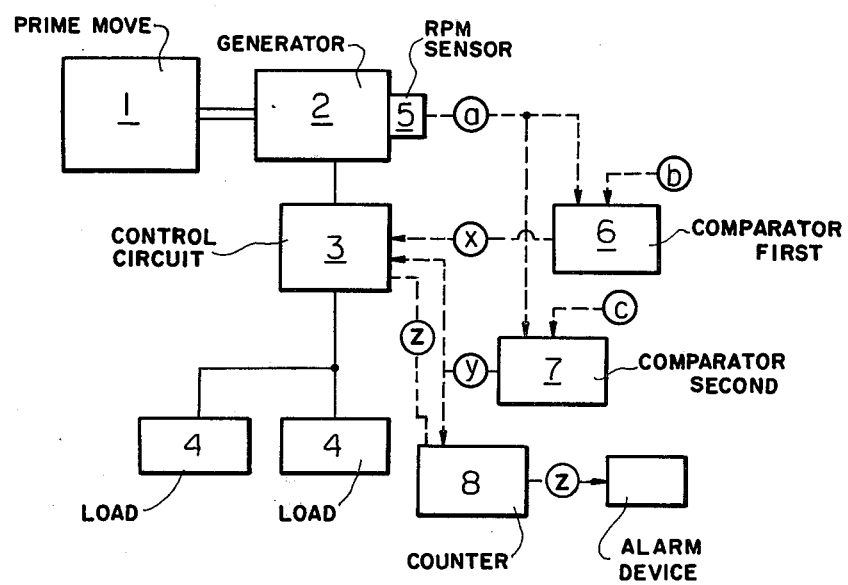
FIG. 1 is a diagram of a generator system of the invention.

In FIG. 1, the reference numeral 1 denotes a prime mover, 2 a generator, and 3 a control circuit including an interrupter. The reference numerals 4 denote loads such as motors selectively connectable to or disconnectable from the generator 2 under the control of control circuit 3. The reference numeral 5 denotes a generator revolution speed detector to detect the revolution speed of generator 2 and generate a signal a indicative of the generator revolution speed, detector 5 being in the form of a pulse pick-up or a tachometric generator. The reference numeral 6 denotes a comparator to receive signal a from detector 5 and compare signal a with a fixed reference b indicative of a predetermined revolution speed approaching a rated revolution speed of the generator 2 so as to generate a connection command signal x when signal a exceeds fixed reference b.

The reference 7 denotes a comparator to receive signal a from detector 5 and compare signal a with a fixed reference c indicative of a predetermined revolution speed that is set at a level lower than the rated revolution speed of generator 2 and above a revolution speed of generator 2 when prime mover 1 is idling so as to generare a disconnection command signal y when signal a drops below fixed reference c. The reference numeral 8 denotes a counter which counts the occurrence of disconnection command signal y and generates a connection inhibit signal z when counter 8 has counted to a predetermined number.

The starting sequence is carried out in the following manner. As generator revolution indicating signal a, detected by generator revolution speed detector 5, increases and reaches fixed reference b, comparator 6 generates connection command signal x and the interruptor of control circuit 3 is closed in response to signal x, connecting motors 4 to generator 2.

Figure 2A:
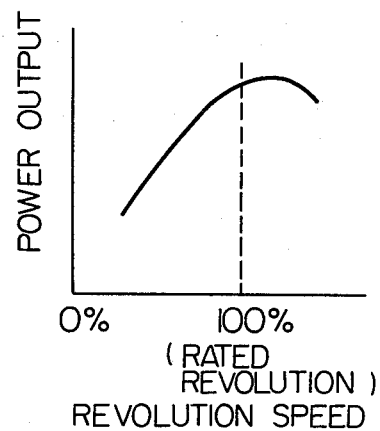
FIG. 2A is a graph showing an output-revolution speed characteristic curve of a reciprocatory internal combustion engine.
Figure 2B:
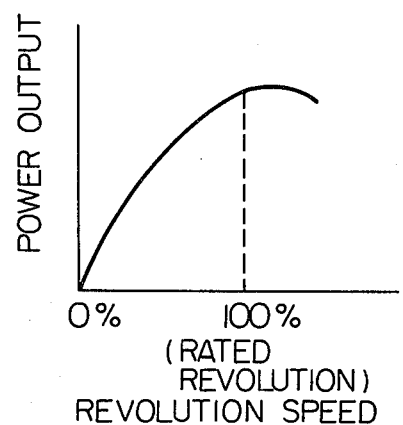
FIG. 2B is a similar graph to FIG. 2A showing an output-revolution speed characteristic curve of a two-shaft gas turbine engine.

In the case that motors 4 are connected to generator 2, should there be a drop in power output from prime mover 1 as motors 4 start, the revolution speed of generator 2 would drop because load required for getting motor 4 to start, which is greater than the rated load of motors 4, is applied to generator 2. Although prime mover 1 is so controlled as to revolve at its rated revolution speed, there is a considerable power output drop when prime mover 1 operates at speeds below the rated revolution speed as shown in FIGS. 2(A) and 2(B). As the revolution speed of prime mover 1 decreases below the rated revolution speed, the power output from generator 2 also decreases. Therefore, when the connection between motors 4 and generator 2 is effected, the revolution speed of the generator 2 would be on the decline if there should occur a drop in power output on the part of prime mover 1.

Under this condition, according to the invention, disconnection command signal y is generated by comparator 7 and fed to control circuit 3 to effect disconnection of motors 4 from generator 2, when signal a drops below fixed reference c, thus allowing generator 2 to be free from the load to increase its revolution speed rapidly. As the revolution speed increases and signal a exceeds fixed reference b again, connection command signal x is fed to control circuit 3 to effect connection of motors 4 to generator 2 again. As compared to the previous connection of motors 4 to generator 2, the torque required by generator 2 to drive motors 4 is small this time because motors 4 have obtained some rotation already. It will be noted that with the control system it is possible to increase the revolution speed of motors 4 up to the required level.

Figure 3A:
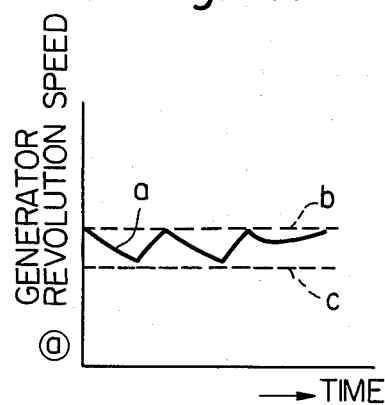
FIG. 3A is a graph showing a generator revolution speed-time characteristic in the generator system shown in FIG. 1 when the prime mover power output is reduced.
Figure 3B:
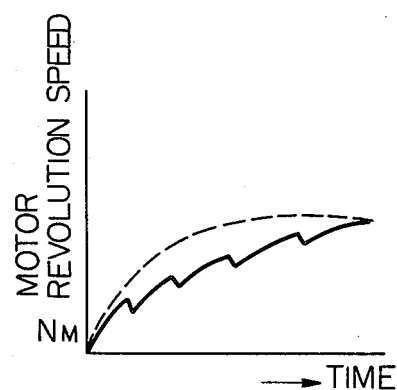
FIG. 3B is a graph showing a motor revolution speed-time characteristic in the generator system shown in FIG. 1 when the prime mover power output is reduced.

If the power output from prime mover 1 drops below the rated load of motors 4, connection of motors 4 to generator 2 and disconnection of the former from the latter will rapidly cycle take place alternatively and repeatedly an infinite number of times. To prevent this, counter 8 generates connection inhibit signal z when signal y occurs a predetermined number times, such as 5 or 6 times, and the connection of the motors 4 to generator 2 will be inhibited upon occurrence of connection inhibit signal z. A warning signal will also be produced to alert an operator and/or the amount of load on generator 2 will be reduced. Counter 8, of course must be reset to zero before getting motors to start. The above operation will be understood well by making a reference to FIGS. 3(A) and 3(B).

It will now be appreciated that with a control system according to the invention a maximum of loads which can be driven by a generator is increased.

What is claimed is:

1. A control system for a generator system having a prime mover, a generator driven by the prime mover and a load adapted to be connected to the generator, said control system comprising:
   a detector means for detecting the revolution speed of the generator;
   a first comparator means for generating a first signal when said revolution speed of the generator is lower than a first fixed reference indicative of a level higher than a level in revolution speed of the generator when the prime mover is idling;
   a second comparator means for generating a second signal when said revolution speed of the generator is higher than a second fixed reference indicative of a level approaching the rated revolution speed of the generator; and
   a control circuit means for connecting the load to the generator in response to said second signal but for disconnecting the load from the generator in response to said first signal.

2. A control system as claimed in Claim 1, in which there is provided a counter means for generating a third connection inhibit signal when the number of occurrences of one of said first and second signals reaches a predetermined count.

3. In an electricity generating system having a prime mover and an electrical generator driven by said prime mover and connectable to at least one load, the method of controlling the connection between said generator and said at least on load comprising the steps of:
   sensing the rotational speed of said prime mover and producing a speed signal indicative of the sensed rotational speed;
   comparing the speed signal with first and second predetermined reference signals respectively indicative of first and second predetermined rotational speeds;
   producing a first output signal upon the comparison between said speed signal and said first reference signal indicating that the rotational speed of said prime mover is below said first predetermined rotational speed;
   producing a second output signal upon the comparison of said speed signal and said second predetermined reference signal indicating that the rotational speed of said prime mover is above said second predetermined rotational speed;
   connecting said at least one load to said generator in response to said second output signal; and
   disconnecting said at least one load from said generator in response to said first output signal,
   whereby said prime mover is able to accelerate without load between said predetermined first and second rotational speeds.

4. A method as claimed in claim 3, further comprising the steps of:
   counting the number of times said first and second output signals are produced; and
   producing a third signal for alerting an operator and inhibiting connection of said at least one load to said generator when the number of times one of said first and second output signals is produced reaches a predetermined number.

5. An electricity generating system comprising:
   a prime mover;
   an electrical generator connected to and driven by said prime mover;
   at least one load;
   a control circuit interposed between said generator and said at least one load for connecting and disconnecting said at least one load and said generator;
   a rotational speed sensor connected to said prime mover for generating a speed signal indicative of the rotational speed of said prime mover;
   a first comparator connected to said sensor for comparing said speed signal with a first reference signal indicative of a first predetermined rotational speed, said first comparator generating a first output signal when the magnitude of said speed signal is lower than the magnitude of said first reference signal;
   a second comparator connected to said sensor for comparing said speed signal with a second reference signal indicative of a second predetermined rotational speed higher than said first predetermined rotational speed, said second comparator generating a second output signal when the magnitude of said speed signal is higher than the magnitude of said second reference signal;
   said control circuit being connected to said first and second comparators for receiving said first and second output signals and connecting said at least one load to said generator in response to said second output signal and disconnecting said at least one load in response to said first output signal;
   a counter connected to said second comparator and said control circuit for counting the number of times said second output signal is produced, said counter producing an inhibit signal when the number of times said second output signal is produced exceeds a predetermined number, said inhibit signal being applied to said control circuit to inhibit connection of said at least one load and said generator; and an alarm device connected to said counter and which upon receipt of said inhibit signal generates an alarm signal to alert an operator.

* * * * *